Patented Aug. 17, 1937

2,090,263

UNITED STATES PATENT OFFICE 2,090,263

HYDRAULIC FLUID

Douglas V. Moses, Wilmington, Del., assignor to E. I. du Pont de Nemours & Company, Wilmington, Del., a corporation of Delaware No Drawing. Application February 24, 1933, Serial No. 658,439

6 Claims. (Cl. 252—5)

This invention relates to compositions of matter and more particularly to fluids especially desirable for use in hydraulically operated apparatus, particularly energy transmitting devices such, for example, as hydraulic brake systems, hydraulic jacks, and the like.

It has previously been proposed to use solutions of ethyl alcohol and castor oil, and the like, for actuating the pressure-operated elements of hydraulic brake systems and similarly operated devices. Solutions of this nature, however, have been characterized by numerous disadvantages, such, for example, as gasification at higher temperatures, tendency toward solidification of such mixtures at lower temperatures, and undesirably wide change in viscosity under varying temperatures, or the like. Of even more disadvantage, perhaps, has been the effect of such mixtures or solutions upon rubber washers, cups, diaphragms, etc., utilized in the apparatus, giving rise as it does to a swelling thereof and eventual failure of the apparatus.

With the intent to eliminate the hazards and disadvantages hereinbefore described, it is an object of this invention to provide a new and improved hydraulic fluid possessing a number of advantageous characteristics.

Other objects and advantages of the invention will be apparent by reference to the following specification and appended claims wherein the details and preferred embodiments of the invention are described.

According to this invention a highly desirable fluid for use in hydraulically operated systems, hydraulic jacks, door checks, or the like, free from disadvantages previously described, is obtained by mixing an aliphatic monohydric alcohol boiling above 80° C. and a polyhydric alcohol or derivatives thereof particularly those that contain a hydroxy group, such as diethylene glycol monoethyl ether. I have found further that characteristics of these fluids may be advantageously augmented by addition thereto of a lubricant such as colloidal graphite or an oil characterized by low solidifying point, for example, any of the well known vegetable, animal, fish, or mineral oils, or a soap. Furthermore, according to this invention, when utilizing a mixture of a monohydric alcohol and a polyhydric alcohol or derivative thereof, in conjunction with an oil lubricant I have found that metal corrosion of said mixture may be inhibited by the utilization therewith of a toluidine, di- or triethanolamine or a soap.

Compared with hydraulic fluids hitherto suggested the mixtures prepared according to this invention possess highly improved characteristics for utilization in hydraulic apparatus generally. Thus, for example, the viscosity of the fluid of this invention is highly uniform thruout a wide temperature range, does not precipitate under low temperatures, is free from objectionable gasification phenomena and, moreover, exerts no disadvantageous corrosive action upon the metallic parts with which it comes in contact. As a further and distinct advantage, altho castor oil-alcohol mixtures previously proposed are characterized by a deleterious rubber attack which ordinarily affects wheel cups, washers, and the like, resulting in prohibitive degradation and swelling thereof, the fluid of this invention has little or no deleterious action upon rubber.

A slight metal attack or corrosion, so slight as to be practically negligible, has been noted when using mixtures according to this invention which do not contain the soap, toluidine, or triethanolamine previously described. When these last named substances are included, however, their inhibitory, as well as their lubricating action, is so efficient, even in small quantities, as to obviate any danger of metal attack. Any soluble soap, such as ordinary soap, may be used, as for example, sodium or potassium salts of stearic, palmitic, oleic, lauric and like acids.

The proportions of toluidine, triethanolamine and soap may vary over a wide range, but I have found that only relatively small quantities are necessary to ensure complete protection from metal attack. Thus, for example, 0.1% by volume of ordinary soap or 1% of a mixture of 50% orthotoluidine and 50% triethanolamine, are sufficient to inhibit metal attack if present in the hydraulic fluids of this invention.

The polyhydric alcohols or derivatives thereof, acting in the double role of inhibitors of rubber attack and hydraulic fluids, when used with castor oil and an alcohol, may be used in varying proportions and, as a matter of fact, may be utilized over as wide a range of proportions as the other constituents, inasmuch as they have of themselves desirable viscosity characteristics.

Although I have found that any of the higher aliphatic alcohols boiling above 80° C. may be used advantageously according to this invention, such, for example, as the butyl, amyl, propyl, and higher alcohols, I prefer to utilize isobutanol. The polyhydric alcohols generally, or their derivatives, may also be used, such, for example, as the glycols, such as ethylene and propylene glycol, the glycol ethers, and the like, but I prefer to use diethylene glycol and/or monoethyl ether of diethylene glycol. In like manner any of the oils, vegetable, mineral, or the like, such as rape seed oil, tung oil, or high grade mineral oil, may be used so long as they possess low solidifying point, will stand considerable heat, and do not give rise to gummy formations and the like.

The range of proportions of, as well as the constituents of my invention, will be indicated in the following examples, although it will be understood that the invention is in no way to be limited thereby and other alcohols and the like may be used.

*Parts by volume*

| | | | |
|---|---|---|---|
| I | Isobutanol 65 | Diethylene glycol 34.9 | Common soap 0.1 |
| II | Do 80 | do 19 | Do 0.1 |
| III | Do 60 | Monoethyl ether of diethylene glycol 40 | |
| IV | Do 70 | Diethylene glycol 10 | Castor oil 20 |
| V | Do 60 | Monoethyl ether of diethylene glycol 20 | |
| VI | Castor oil 19 | | 50—50 orthotoluidine triethanolamine 1 |

Various changes may be made in the proportions of constituents of this invention without departing therefrom or sacrificing any of the advantages thereof.

I claim:
1. A hydraulic fluid comprising a solution of isobutanol and a glycol.
2. A hydraulic fluid comprising a solution of isobutanol and diethylene glycol.
3. A hydraulic fluid comprising a solution of isobutanol, a lubricant, and a glycol.
4. A hydraulic fluid comprising a solution of isobutanol, castor oil, a soap, and a glycol.
5. A hydraulic fluid comprising a solution of isobutanol, colloidal graphite, and a glycol.
6. A hydraulic fluid comprising a solution of isobutanol and a glycol, the isobutanol being present in the major proportion.

DOUGLAS V. MOSES.